3,112,282
PROCESS FOR POLYMERIZING VINYL ESTER IN AQUEOUS EMULSION CONTAINING WATER-SOLUBLE COLLOIDAL EMULSIFYING AGENT AND WATER-IMMISCIBLE NON-IONIC SURFACE ACTIVE AGENTS
Wilford Donald Jones, Florham Park, and Richard H. Cahill and John C. Lukman, Morris Plains, N.J., assignors to Celanese Corporation of America, New York, N.Y., a corporation of Delaware
No Drawing. Filed Sept. 8, 1955, Ser. No. 533,256
18 Claims. (Cl. 260—17)

This invention relates to emulsions and relates more particularly to the preparation of latices of polymers of vinyl esters of fatty acids, such as vinyl acetate.

Latices of vinyl acetate homopolymers and copolymers are used extensively in the manufacture of water-base paints. It is desirable for this purpose that the latices should tolerate large quantities of pigment, should be stable to freezing and thawing and should dry in air to produce coherent and adherent films which are not grainy or cloudy. The films should also withstand water-spotting and should not tend to reemulsify when wet. The latices of vinyl acetate polymers currently employed are deficient in one or more of these properties.

It is therefore an object of this invention to provide an improved vinyl acetate polymer latex which will have the foregoing and other desirable properties, and a novel process for preparing the same.

Another object of this invention is the provision of a vinyl acetate or other vinyl ester polymer latex which will dry in air to produce a very clear film, and of a new method for preparing the same.

Still another object of this invention is to provide an improved vinyl acetate polymer latex paint.

Other objects of this invention will be apparent from the following detailed description and claims. In this description and claims all proportions are by weight unless otherwise indicated.

In accordance with one aspect of this invention vinyl acetate or other vinyl ester of a fatty acid is polymerized in an aqueous emulsion containing a water-soluble colloidal emulsifying agent and a water-immiscible nonionic surface-active agent containing a polyalkylene oxide chain, preferably a lower polyalkylene oxide chain, and compatible with the polymer of said vinyl ester. The latices resulting from this polymerization yield films of outstanding clarity.

The water-soluble colloidal emulsifying agent may be any of those conventionally employed in the art, e.g. polyvinyl alcohol. However, especially good results have been obtained by the use of hydroxyethyl cellulose. Films deposited from latices made in accordance with this invention and using hydroxyethyl cellulose have exceptional resistance to water-spotting.

Examples of water-immiscible nonionic surface active agents containing polyalkylene oxide chains and suitable for use in the practice of this invention are the water-immiscible polypropylene glycols, produced by polymerization of propylene oxide; the water-immiscible reaction products of such polypropylene glycols and ethylene oxide which may be termed polypropylene-polyethylene glycols; and alkyl phenol polyethylene glycol ethers made by the reaction of alkyl phenols, e.g. octyl, nonyl or decyl phenols, and ethylene oxide. Preferably, the mixture being polymerized contains at least one water-immiscible surface-active agent comprising a polymer of propylene oxide, e.g. the homopolymeric polypropylene glycol or the copolymeric polypropylene-polyethylene glycols referred to above, which may be the sole water-immisicble nonionic surface active agent present but which is desirably admixed with a water-immiscible alkyl phenol polyethylene glycol ether. Specific examples of commercially available materials of this type are the polypropylene glycol of molecular weight of about 1500 to 1800 known as "Pluronic L–60"; the reaction products of this polypropylene glycol with ethylene oxide, known as "Pluronic L–61" and "Pluronic L–62" and having ethylene oxide contents of 10 to 20% and 20 to 30%, respectively; and the nonyl phenyl polyethylene glycol ether containing about four ethylene oxide units per alkyl phenyl group in the molecule and having a solubility in water of less than 0.01% by weight, sold as "Tergitol NP–14." As used herein the term "water-immiscible" is used to designate materials having a cloud point for a 1% solution in water of less than 40° C., the cloud point being the temperature at which such solution shows turbidity on being warmed.

In accordance with a more specific aspect of this invention, the vinyl acetate or other vinyl ester of a fatty acid is polymerized in an aqueous emulsion containing small amounts of a mixture of dispersing or emulsifying agents comprising (I) water-soluble hydroxyethyl cellulose, (II) an anionic surface-active agent comprising an organic sulfonate, (III) a water-miscible nonionic surface-active agent containing polymerized ethylene oxide units, and (IV) the water-immiscible nonionic surface-active agent containing polyalkylene oxide chains, previously described. The resulting latices have excellent freeze-thaw stability. Preferably, the amount of water-immiscible nonionic surface-active agent is greater than the amount of water-miscible surface-active agents present in the emulsion, in order that the films produced from the resulting latices should be especially clear and should have outstanding resistance to water-spotting.

Particularly good results have been obtained in the process of this invention when the mixture of dispersing or emulsifying agents comprises, a blend of (I) hydroxyethyl cellulose, (II) a sodium salt of an alkyl aryl sulfonic acid, (III) a product obtained by the reaction of a water-insoluble polymer of propylene oxide with sufficient ethylene oxide to produce a water-miscible material, and (IV) the previously described mixture of a water-immiscible polypropylene glycol or polypropylene-polyethylene glycol and a water-immiscible alkyl phenyl ethylene glycol ether. As the constituent II, the sodium dodecyl benzenesulfonate sold under the name "Santomerse No. 3" is particularly suitable. Examples of other organic sulfonates are "Aerosol OT" (sodium octyl sulfosuccinate), "Santomerse D" (sodium dodecyl benzene sulfonate) and "Igepon TN 74" (sodium N-methyl-N-palmitoyl tauride). As the constituent III, it is preferred to use the product obtained by the reaction of a polypropylene glycol of molecular weight of about 1500 to 1800 with ethylene oxide, the ethylene oxide content of the product being 80 to 90%, said product being sold under the name "Pluronic F–68." Other water-miscible nonionic surface active agents which may be employed are the reaction products of one mole of nonyl phenol and about 20 to 30 moles of ethylene oxide, sold under the names "Igepal CO–880," "Igepal CO–850" and "Tergitol NP–40"; "Emulphor ON–870" (the reaction product of one mole of oleyl alcohol and about 20 moles of ethylene oxide); "Emulphogene AM–870" (the reaction product of one mole of tallow alcohols and about 20 moles of ethylene oxide); "Tergitol Non-ionic TMN" (trimethyl nonyl alcohol-ethylene oxide reaction product); and "Tergitol Non-ionic XD" (polymer containing propylene oxide and ethylene oxide units).

Very suitable forms of hydroxyethyl cellulose are those sold under the name "Cellosize" such as "Cellosize WP–09" or "Cellosize WP3," "Cellosize WP40," "Cellosize WSLX" or mixtures thereof. The amount of hydroxyethyl cellulose is advantageously at most about 1%, preferably about 0.1 to 1.0% of the total weight of the emulsion.

For best results, the proportions of anionic surface-active agent (II) should be about 0.05 to 0.5%, preferably 0.1 to 0.3%, of the total weight of the emulsion, while the proportion of water-miscible nonionic surface-active agent (III) should be about 0.1 to 1.0%, preferably 0.2 to 0.5% based on the total weight of the emulsion, and the proportion of water-immiscible non-ionic surface-active agent (IV) should be about 0.5 to 3.0%, preferably 1.0 to 2.0%, based on the total weight of the emulsion and, as previously stated, should be larger than the proportion of water-soluble nonionic surface-active agent.

The process of this invention may be employed for the homopolymerization of vinyl acetate or other vinyl ester of a fatty acid or for the copolymerization of the vinyl ester with other monomers, which are preferably used in minor amounts, e.g. 30% or less, based on the total weight of monomers being polymerized. Thus, it has been employed, for example, in the homopolymerization of vinyl acetate and of vinyl propionate and for the copolymerization of vinyl acetate with vinyl propionate, vinyl butyrate, dibutyl maleate, dibutyl fumarate, dibutyl itaconate, ethyl acrylate, butyl acrylate and methacrylic acid.

In carrying out the process of this invention it is generally desirable to use relatively large amounts of monomeric polymerizable material, in relation to the other constituents of the emulsion, in order to obtain a relatively concentrated latex. Thus, the total amount of monomeric material polymerized should be about 40 to 60%, preferably 45 to 55%, based on the total weight of the latex. However, during polymerization it is advantageous to add the monomeric material gradually to the aqueous medium containing the surface-active agents, the rate of addition being such that the concentration of unpolymerized monomer in the emulsion during polymerization is relatively low, e.g. less than 5%. Preferably, the monomer is added at about the rate at which it polymerizes.

In the practice of this invention a free radical-producing initiator or catalyst, such as a peroxide, is generally employed for bringing about the polymerization reaction. Alkali metal persulfates, such as potassium persulfate, have been found to be very effective peroxide initiators for this purpose. Other suitable initiators are well known in the art, e.g. hydrogen peroxide, and such combinations as mixtures of hydrogen peroxide and an iron salt; hydrogen peroxide and zinc formaldehyde sulfoxylate or other similar reducing agent; hydrogen peroxide and a titaneous salt; potassium persulfate and sodium bisulfite; a bromate mixed with a bisulfite; and other redox catalyst systems. The proportion of catalyst may be varied, one suitable range being 0.05 to 0.3% based on the total weight of the emulsion.

It is desirable to carry out the polymerization reaction at an elevated temperature, e.g. about 60 to 95° C., preferably about 75 to 85° C. However, lower temperatures may be used with more active initiator systems. Polymerization may be carried out at atmospheric, superatmospheric or subatomspheric pressures.

It is often advantageous to incorporate an alkaline material, such as sodium bicarbonate, into the emulsion in order to control its pH during polymerization. Such alkaline material may be present in small amounts, e.g. 0.02 to 0.20%, based on the total weight of emulsion, so that the pH of the emulsion after polymerization is about 4 to 6.

It is desirable to have present in the latex a chelating and sequestering agent, preferably one containing amine and carboxylic acid groups, such as for example, iminotriacetic acid or its alkali metal salts or ethylene diamine tetraacetic acid or its alkali metal salts. Especially good results have been obtained by the use of the trisodium salt of ethylene diamine tetraacetic acid. When the chelating and sequestering agent is included in the latex, white paint films produced from the latex have greatly improved resistance to yellowing during weathering. The sequestering agent may be added before, during or after the polymerization reaction. One suitable range of proportions for the sequestering agent is 0.01 to 0.1 parts per 100 parts of latex.

The latices produced in accordance with this invention are generally of small particle size. A representative latex contains particles of 0.05 to 0.6 micron in diameter, with the great majority having diameters less than 0.3 micron.

In one preferred embodiment of this invention most of the water to be used is mixed with all of the dispersing or emulsifying agents, together with the major part of the catalyst and some of the alkaline material. A small portion (e.g. 5%) of the total monomer is added and the mixture is heated to, and maintained at, its reflux temperature. Then the balance of the monomer is added gradually with agitation. After all the monomer has been added, the small remaining portion of the catalyst is added and the heating is continued until there is very little monomer, e.g. less than 0.5%, in the product. After cooling, the balance of the water and alkaline material are added.

The latices produced in accordance with this invention tolerate large quantities of pigment and are stable to freezing and thawing. Films produced by applying the emulsions to a substrate and drying in air are coherent and adherent, are not grainy or cloudy, have high resistance to water-spotting and do not tend to reemulsify when wet.

Paints may be produced from the the vinyl acetate polymer latices of this invention by mixing said latices with pigments and, in certain cases as when the homopolymer of vinyl acetate is used, with appropriate plasticizers well known to the art.

Examples of pigments which may be employed for producing paints in accordance with this invention are titanium dioxide such as that known as "Titanox RA–50"; lithopone such as that known as "Albalith 14"; antimony oxide; barytes; diatomaceous silica, e.g. "Celite 281"; talc such as "Nytal 300"; clay such as that sold under the name "ASP 400"; mica, for example 325 mesh waterground mica; red, yellow, black and brown iron oxides, e.g. "Irox Red 1380" and "Mapico Brown"; maroon oxides; metallic browns; cadmium red; toluidine red; para red; lithol toner; cadmium yellow; hansa yellow; benzidine yellow; dinitraniline orange; chromium oxide green; phthalocyanine green; phthalocyanine blue; lampblack; carbon black; mineral black; metallic flakes and powders (e.g. aluminum, copper); and luminous pigments.

The amount of pigment used may be varied widely. It has been found that the latices of this invention tolerate unusually large amounts of pigment without coagulating and also without loss of the desirable properties of the dried films made from such pigmented latices. Thus paints made from the latices of this invention have a critical P.V.C. (pigmented volume concentration) of over 55%. "P.V.C." is defined in the art as the volume of pigment divided by the sum of the volume of pigment and the volume of non-volatile vehicle in the paint, while "Critical P.V.C." is defined as the P.V.C. above which the scrubbability, gloss, weatherability, water resistance and other factors dependent on continuity of the film are rapidly lost.

Examples of plasticizers which may be used in the manufacture of the paint are monomeric ester plasticizers such as dibutylphthalate, or alkyd resin type polyesters, e.g. "Paraplex G25", "Paraplex G40", "Paraplex G60", or "Resoflex R–296"; chlorinated diphenyls such as that sold under the name "Aroclor 1242," and extender type plasticizers such as the substituted biphenyls sold by Monsanto Chemical Company under the names "HB40" and "HB20".

The amount of plasticizer it is preferred to use varies depending on the particular plasticizer chosen. Thus, for such plasticizers as dibutyl phthalate, dioctyl phthalate and tricresyl phosphate the preferred proportion is about 10 to 15% based on the weight of polyvinyl acetate, while for dioctyl sebacate or dioctyl adipate it is about 8 to 10% and for the alkyd resinous type of plasticizer it is about 12 to 20%. Smaller proportions, or no plasticizer at all, should be employed with those copolymers of vinyl acetate which are internally plasticized by the presence of the copolymerized ethylenically unsaturated compound.

The following examples are given to illustrate this invention further:

Example I 2.4 parts of "Pluronic L-61", 0.4 part of "Pluronic F-68", 0.2 part of "Santomerse No. 3", 0.3 part of "Cellosize WP-09", 0.2 part of "Tergitol NP-14", and 0.06 part of sodium bicarbonate are dissolved in 41 parts of water and heated to a temperature of 50 to 55° C. This heated solution is stirred while there is added 0.15 part of potassium persulfate, followed by 2.65 parts of vinyl acetate, and the mixture is heated to its reflux temperature at atmospheric pressure, i.e. 67° C. Refluxing is continued until the reflux temperature rises to 78 to 80° C. due to depletion of vinyl acetate by polymerization thereof. Thereafter, 49.85 parts of vinyl acetate are added gradually over a three hour period at such a rate that the reflux temperature rises to, and is maintained at, 82 to 84° C. At the end of this period a solution of 0.01 part of potassium persulfate in 0.7 part of water is added and heating is continued until the vinyl acetate content of the mixture is below 0.5%. Thereafter, the resulting latex is cooled to 75° C., 0.06 part of sodium bicarbonate, and 0.02 part of "Sequestrene NA3", and 2 parts of water are added, and the mixture is cooled further to room temperature.

The resulting latex is free of gel particles and produces completely transparent films on glass; its pH is 5.1; its viscosity is 1100 to 1300 cps. and it remains stable when subjected to 6 freeze-thaw cycles involving freezing at −12° C. for 16 hours followed by thawing.

When the latex is mixed with minor amounts of plasticizer such as dibutyl phthalate there are obtained clear mixtures which when cast on glass and dried produce clear films of very good resistance to water-spotting.

Example II

Example I is repeated except that the proportions of certain ingredients are changed. Thus, the amount of "Pluronic L-61" employed is 0.9 part, the amount of "Santomerse No. 3" is 0.3 part, and the amount of "Tergitol NP-14" 0.9 part, while the total amount of vinyl acetate used is 53.20 parts rather than 52.50 parts. The properties of the emulsion are substantially the same as those of the emulsion in Example I except that its pH is 5.0, its viscosity slightly higher, and the strength of the plasticized film is higher, though the strength of the unplasticized film is lower, when compared with corresponding films made from the emulsion of Example I.

Example III

This example illustrates the copolymerization of a mixture of 80% of vinyl acetate and 20% of dibutyl fumarate.

1.6 parts of "Pluronic L-61", 0.4 part of "Pluronic F-68," 0.2 part of "Tergitol NP-14", 0.2 part of "Santomerse No. 3", 0.6 part of "Cellosize WP-09" and 0.06 part of sodium bicarbonate are dissolved in 39.6 parts of water and heated to a temperature of 55° C. Then 3.2 parts of the aforesaid mixture of monomers are added, together with a solution of 0.16 part of potassium persulfate in 0.8 part of water, and a mixture is heated to its reflux temperature and stirred rapidly. Heating is continued for about 30 minutes, i.e. until the reflux temperature rises to 78° C., whereupon the addition of further quantities of monomers and catalyst is begun until a total of 10.6 parts of dibutyl fumarate, 42.4 parts of vinyl acetate and 0.248 parts of potassium persulfate has been incorporated. The catalyst is added, in the form of a 0.35% solution thereof in water, in 11 equal portions at about 20 minute intervals. The mixture of monomers is added over a period of about 2½ hours at such a rate that the reflux temperature of the reaction mixture remains at 78 to 79° C. After all of the monomer mixture has been added, the last portion of catalyst is added and the reaction mixture is heated to a temperature of 92 to 93° C. until the monomer content thereof is less than ½%. The mixture is then cooled to 70 to 80° C. and 0.06 part of sodium bicarbonate and 0.9 part of water are added and the mixture is further cooled to room temperature.

The resulting emulsion has a pH of about 4.5 to 5. Its properties are very similar to those of the emulsion of Example I except that its viscosity is somewhat higher.

Example IV

The following materials are blended, in the indicated proportions, in a mixer and then passed through a three-roll mill: 5 parts of "Tergitol NP-14," 5 parts of soybean lecithin (Ross and Rowe 551), 1 part of a mildew preventive known as "Butrol" and comprising a blend of a mercury salt and sodium o-phenyl phenate, 1 part of sodium nitrite, 1 part of potassium carbonate, 18 parts of ethylene glycol, 17 parts of ethyl ether of diethylene glycol, 225 parts of titanium dioxide (semi-chalking grade "Unitane OR-540"), 175 parts of whiting, 100 parts of New York talc ("Nytal 300"), 50 parts of Sierra talc ("HGO-55"), 2 parts of the defoaming agent known as "Foamrex S" and 166 parts of water. The resulting mixture is then blended with 280 parts of the latex of Example III, 2 parts of soybean lecithin (Ross & Rowe 511), 100 parts of water, 181 parts of a 2% aqeous solution of "Methocel" (methyl cellulose, 4000 cps.), and 1 part of "Foamrex S." The resulting paint, having a P.V.C. of 55%, has excellent flow, brushability, and uniformity and yields non-crocked, scrubbable films.

Example V

Example III is repeated except that all of the dibutyl fumarate is replaced by an equal amount of vinyl acetate, so that a vinyl acetate homopolymer latex is produced. The results are very similar to those of Example III.

Example VI

Example III is repeated except that the mixture of monomers comprises 90% of vinyl acetate and 10% of di-n-butyl itaconate. The results are similar to those of Example III. The latex yields films which are considerably more flexible than those obtained from vinyl acetate homopolymer latices.

Example VII 0.4 part of "Santomerse D," 1.5 parts of "Pluronic L-61," 0.5 part of "Pluronic F-68," 0.6 part of "Cellosize WP09" and 425 parts of water are blended to form a solution, which is heated to a temperature of 55° C. Then 0.12 part of potassium persulfate and 3.2 parts of vinyl propionate are added and the mixture is stirred rapidly and heated to a temperature of 75° C. Thereafter 50.8 parts of vinyl propionate are added gradually over a 2¾ hour period while the temperature is maintained at 79 to 81° C., after which a solution of 0.01 part of potassium persulfate in 0.5 part of water is added and the latex is heated to 92.5° C. over a one hour period and then cooled. On drying the resulting latex produces glass-clear tacky films, suitable for adhesive purposes.

It is to be understood that the foregoing detailed description is given merely by way of illustration and that many variations may be made therein without departing from the spirit of our invention.

Having described our invention what we desire to secure by Letters Patent is:

1. Process for the production of a latex of a vinyl ester polymer, comprising polymerizing a vinyl ester of a fatty acid in an aqueous emulsion containing about 0.1 to 1% by weight of said emulsion of a water-soluble colloidal emulsifying agent and about 0.5 to 3% by weight of said emulsion of a water-immiscible non-ionic surface-active agent containing a polyalkylene oxide chain and compatible with the resulting vinyl ester polymer.

2. Process for the production of a latex of a vinyl acetate polymer, comprising polymerizing vinyl acetate in an aqueous emulsion containing about 0.1 to 1% by weight of said emulsion of a water-soluble colloidal emulsifying agent and about 0.5 to 3% by weight of said emulsion of a water-immiscible non-ionic surface-active agent containing a polyalkylene oxide chain and compatible with the resulting vinyl acetate polymer.

3. Process as set forth in claim 2 in which said water-immiscible surface active agent contains a polymer of propylene oxide.

4. Process as set forth in claim 3, in which said emulsion contains also about 0.1 to 1% by weight of said emulsion of a water miscible surface active agent.

5. Process for the production of a latex of a polymer of a vinyl ester, comprising polymerizing a vinyl ester of a fatty acid in an aqueous emulsion containing about 0.1 to 1% by weight of said emusion of water-soluble hydroxyethyl cellulose, about 0.05 to 0.5% by weight of said emulsion of an anionic surface-active agent comprising an organic sulfonate, about 0.1 to 1% by weight of said emulsion of a water-miscible nonionic surface-active agent containing polymerized ethylene oxide units, and about 0.5 to 3% by weight of said emulsion of a water-immiscible nonionic surface-active agent containing a polyalkylene oxide chain, said vinyl ester comprising at least 70% by weight of the total monomer reactant in the process.

6. Process for the production of a latex of a polymer of vinyl acetate, comprising polymerizing vinyl acetate in an aqueous emulsion containing about 0.1 to 1% by weight of said emulsion of water-soluble hydroxyethyl cellulose, about 0.05 to 0.5% by weight of said emulsion of an anionic surface-active agent comprising an organic sulfonate, about 0.1 to 1% by weight of said emulsion of a water-miscible nonionic surface-active agent containing polymerized ethylene oxide units, and about 0.5 to 3% by weight of said emulsion of a water-immiscible nonionic surface-active agent containing a polyalkylene oxide chain, said vinyl acetate comprising at least 70% by weight of the total monomer reactant in the process.

7. Process as set forth in claim 6 in which the vinyl acetate is homopolymerized in said emulsion.

8. Process as set forth in claim 6 in which the vinyl acetate is copolymerized with another water-insoluble monomer in said emulsion.

9. Process as set forth in claim 6 in which said vinyl acetate is added gradually to an emulsion containing said water-soluble hydroxyethyl cellulose, said anionic surface-active agent, said water-miscible nonionic surface-active agent, said water-immiscible nonionic surface-active agent, and a free radical producing polymerization catalyst.

10. Process for the production of a latex of a polymer of vinyl acetate, comprising polymerizing vinyl acetate by adding said vinyl acetate gradually to an aqueous medium maintained at a temperature of about 60 to 95° C. and containing about 0.1 to 1% of water-soluble hydroxyethyl cellulose, about 0.05 to 0.5% of sodium dodecyl benzene sulfonate, about 0.1 to 1% of the product obtained by the reaction of a polypropylene glycol of molecular weight of about 1500 to 1800 with ethylene oxide, the ethylene oxide content of said product being 80 to 90%, about 0.5 to 3% of a mixture of a water-immiscible surface-active agent which is a polymer of propylene oxide, and a water-immiscible surface-active agent which is an alkyl phenyl polyethylene glycol ether, and a polymerization initiator.

11. A latex produced by the process of claim 1.

12. A paint comprising a pigment and a latex produced by the process of claim 1.

13. A latex produced by the process of claim 5.

14. A latex produced by the process of claim 17.

15. A latex produced by the process of claim 10.

16. A paint comprising the latex of claim 15 and a pigment, the pigmented volume concentration of said paint being at least about 55%.

17. Process for the production of a latex of a polymer of vinyl acetate, comprising polymerizing vinyl acetate in an aqueous emulsion containing about 0.1 to 1% by weight of said emulsion of hydroxyethyl cellulose, about 0.05 to 0.5% by weight of said emulsion of a sodium salt of an alkyl aryl sulfonic acid, about 0.1 to 1% by weight of said emulsion of a water-soluble product obtained by reacting a water-immiscible polymer of propylene oxide with ethylene oxide, a water-immiscible nonionic surface-active agent which is a polymer of propylene oxide and a water-immiscible nonionic surface active agent comprising a reaction product of an alkyl phenol and ethylene oxide, said vinyl acetate comprising at least 70% by weight of the total monomer reactant in the process, said water-immiscible nonionic surface-active agents being present in about 0.5 to 3% by weight of said emulsion.

18. Process for the production of a latex of a polymer of vinyl acetate, comprising polymerizing vinyl acetate by adding said vinyl acetate to an aqueous medium maintained at a temperature of about 75 to 85° C. and containing about 0.1 to 1% by weight of said medium of water-soluble hydroxyethyl cellulose, about 0.05 to 0.5% by weight of said medium of sodium dodecyl benzene sulfonate, about 0.1 to 1% by weight of said medium of the product obtained by the reaction of a polypropylene glycol of molecular weight of about 1500 to 1800 with ethylene oxide, the ethylene oxide content of said product being 80 to 90%, a water-immiscible surface-active agent which is a polymer of propylene oxide and a water-immiscible surface-active agent comprising an alkyl phenyl polyethylene glycol ether, said vinyl acetate comprising at least 70% by weight of the total monomer reactant in the process, said water-immiscible surface-active agents being present in about 0.5 to 3% by weight of said medium.

References Cited in the file of this patent

UNITED STATES PATENTS

| | | |
|---|---|---|
| 2,508,342 | Wilson | May 16, 1950 |
| 2,536,018 | Schoenholz et al. | Jan. 2, 1951 |
| 2,536,470 | Schoenholz et al. | Jan. 2, 1951 |
| 2,567,678 | Morrison | Sept. 11, 1951 |
| 2,595,952 | Kunze et al. | May 6, 1952 |
| 2,703,794 | Roedel | Mar. 8, 1955 |
| 2,753,318 | Maeder | July 3, 1956 |
| 2,769,712 | Wilson | Nov. 6, 1956 |
| 2,827,359 | Kine et al. | Mar. 18, 1958 |
| 2,828,222 | Kine et al. | Mar. 25, 1958 |
| 2,956,973 | Holdsworth | Oct. 18, 1960 |

Notice of Adverse Decision in Interference

In Interference No. 95,522 involving Patent No. 3,112,282, W. D. Jones, R. H. Cahill and J. C. Lukman, PROCESS FOR POLYMERIZING VINYL ESTER IN AQUEOUS EMULSION CONTAINING WATER-SOLUBLE COLLOIDAL EMULSIFYING AGENT AND WATER-IMMISCIBLE NON-IONIC SURFACE ACTIVE AGENTS, final judgment adverse to the patentees was rendered Oct. 16, 1969, as to claim 4.

[*Official Gazette June 2, 1970.*]